US012573554B2

(12) United States Patent
Murakami et al.

(10) Patent No.: US 12,573,554 B2
(45) Date of Patent: Mar. 10, 2026

(54) DIELECTRIC COMPOSITION, ELECTRONIC DEVICE, AND MULTILAYER ELECTRONIC DEVICE

(71) Applicant: TDK CORPORATION, Tokyo (JP)

(72) Inventors: Taku Murakami, Tokyo (JP); Nobuto Morigasaki, Tokyo (JP); Takuma Ariizumi, Tokyo (JP); Toshihiko Kaneko, Tokyo (JP); Yasuhiro Ito, Tokyo (JP)

(73) Assignee: TDK CORPORATION, Tokyo (JP)

( * ) Notice: Subject to any disclaimer, the term of this patent is extended or adjusted under 35 U.S.C. 154(b) by 955 days.

(21) Appl. No.: 17/588,511

(22) Filed: Jan. 31, 2022

(65) Prior Publication Data

US 2022/0254567 A1     Aug. 11, 2022

(30) Foreign Application Priority Data

Feb. 9, 2021     (JP) ................................. 2021-019251

(51) Int. Cl.
*H01G 4/12* (2006.01)
*C04B 35/01* (2006.01)
(Continued)

(52) U.S. Cl.
CPC ............... *H01G 4/12* (2013.01); *C04B 35/01* (2013.01); *C04B 35/4682* (2013.01); *H01G 4/30* (2013.01);
(Continued)

(58) Field of Classification Search
CPC . H01G 4/12; H01G 4/30; C04B 35/01; C04B 35/4682; C04B 2235/3224; C04B 2235/3418; C04B 2235/3206; C04B 2235/3213; C04B 2235/3215; C04B 2235/3225; C04B 2235/3241;
(Continued)

(56) References Cited

U.S. PATENT DOCUMENTS

| | | | |
|---|---|---|---|
| 2007/0191211 A1 | 8/2007 | Hosono et al. | |
| 2014/0240896 A1* | 8/2014 | Morigasaki | .............. H01G 4/30 |
| | | | 501/138 |

FOREIGN PATENT DOCUMENTS

| | | |
|---|---|---|
| CN | 101024572 A | 8/2007 |
| JP | 2005-029423 A | 2/2005 |

(Continued)

*Primary Examiner* — Cameron K Miller
(74) *Attorney, Agent, or Firm* — Oliff PLC

(57) ABSTRACT

A dielectric composition includes a main-phase particle and segregation particles. The main-phase particle includes a main component having a perovskite crystal structure represented by a general formula of $ABO_3$. The dielectric composition includes RA, RB, M, and Si. Each of A, B, RA, RB, and M is one or more elements selected from a specific element group. Each of an RA content $C_{RA}$ to the main component, an RB content $C_{RB}$ to the main component, an M content to the main component, and a Si content to the main component is within a predetermined range. $0.50 < (\alpha/\beta)/(C_{RA}/C_{RB}) \le 1.00$ is satisfied, where a is an average RA content (mol %) and β is an average RB content (mol %) of specific segregation particles mainly including RA, RB, Si, Ba, and Ti in the segregation particles.

6 Claims, 3 Drawing Sheets

Figure 1A:
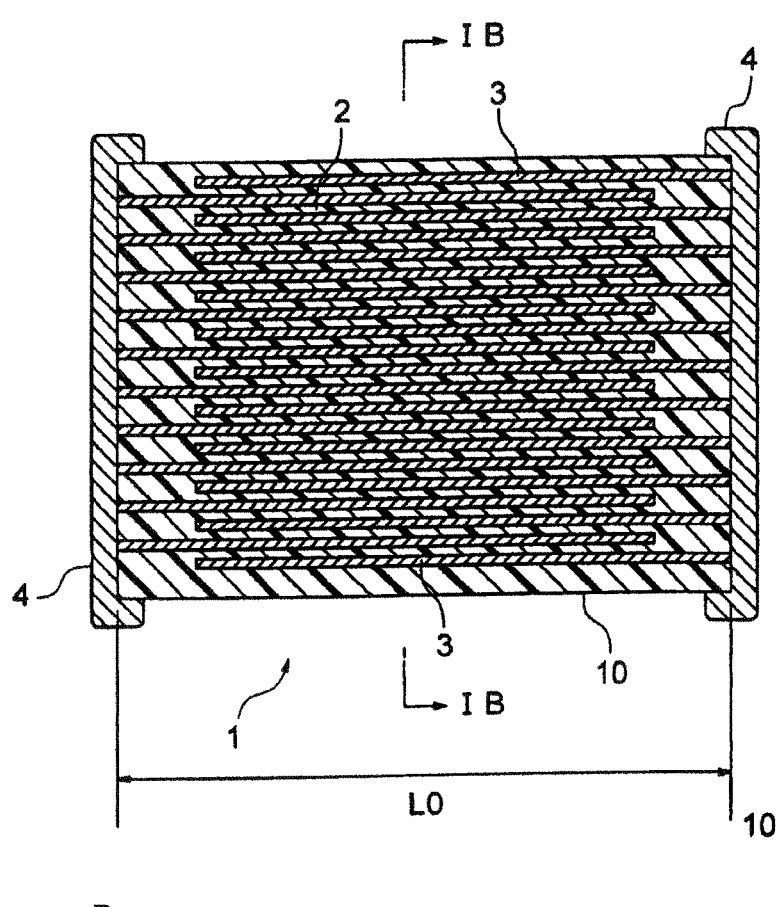

(51) Int. Cl.
  *C04B 35/468* (2006.01)
  *H01G 4/30* (2006.01)

(52) U.S. Cl.
  CPC ................. *C04B 2235/3224* (2013.01); *C04B*
  *2235/3418* (2013.01)

(58) Field of Classification Search
  CPC .... C04B 2235/3262; C04B 2235/6582; C04B
  2235/6584; C04B 2235/6588
  See application file for complete search history.

(56) References Cited

FOREIGN PATENT DOCUMENTS

| | | |
|---|---|---|
| JP | 5541318 B2 | 7/2014 |
| JP | 2014-162679 A | 9/2014 |

* cited by examiner

DIELECTRIC COMPOSITION, ELECTRONIC DEVICE, AND MULTILAYER ELECTRONIC DEVICE

BACKGROUND OF THE INVENTION

The present invention relates to a dielectric composition, an electronic device, and a multilayer electronic device.

In recent years, there has been a demand for a dielectric composition having favorable temperature characteristics and high reliability under high temperature and high electric field, and an electronic device and a multilayer electronic device including the dielectric composition.

Patent Document 1 discloses an invention relating to a dielectric ceramic including a main component of $ABO_3$. In the dielectric ceramic, rare earth elements are divided into two groups, and each addition amount is limited. As a result, a dielectric ceramic excellent in temperature characteristics, relative permittivity, and high-temperature load life is obtained.

At present, however, there is a demand for a dielectric composition having more favorable temperature characteristics, relative permittivity, and high-temperature load life.

Patent Document 1: JP5541318 (B2)

BRIEF SUMMARY OF THE INVENTION

The present invention has been achieved under such circumstances. It is an object of the present invention to provide a dielectric composition or the like having favorable temperature characteristics, relative permittivity, and high-temperature load life.

To achieve the above object, a dielectric composition according to the present invention comprises:

a main-phase particle including a main component having a perovskite crystal structure represented by a general formula of $ABO_3$; and
segregation particles,
wherein
the dielectric composition includes RA, RB, M, and Si,
A is at least one selected from Ba, Sr, and Ca,
B is at least one selected from Ti, Zr, and Hf,
RA is at least one selected from Eu, Gd, Tb, and Dy,
Rb is at least one selected from Y, Ho, and Yb,
M is at least one selected from Mg, Mn, C, and Cr,
an RA content $C_{RA}$ to the main component is 0.60 mol % or more and 2.40 mol % or less in terms of $RA_2O_3$,
an RB content $C_{RB}$ to the main component is 0.30 mol % or more and 1.20 mol % or less in terms of $RB_2O_3$,
an M content to the main component is 0.20 mol % or more and 1.00 mol % or less in terms of MO,
a Si content to the main component is 0.60 mol % or more and 1.80 mol % or less in terms of $SiO_2$, and
$0.50 < (\alpha/\beta)/(C_{RA}/C_{RB}) \leq 1.00$ is satisfied, where a is an average RA content (mol %) and β is an average RB content (mol %) of specific segregation particles mainly including RA, RB, Si, Ba, and Ti in the segregation particles.

A total area ratio of the specific segregation particles to a total area ratio of the segregation particles may be 80% or more on a cross section of the dielectric composition.

An electronic device according to the present invention comprises the dielectric composition.

A multilayer electronic device according to the present invention comprises dielectric layers and electrode layers alternately stacked, wherein the dielectric layers comprise the dielectric composition.

BRIEF DESCRIPTION OF THE DRAWING(S)

Figure 1B:
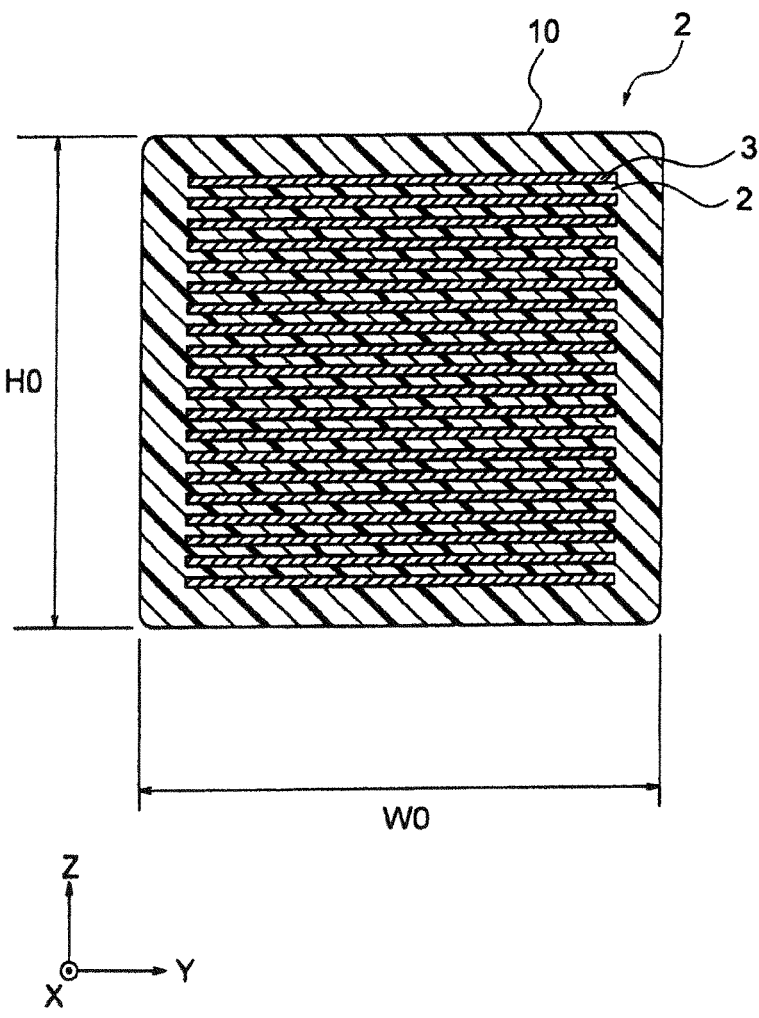
Figure 2:
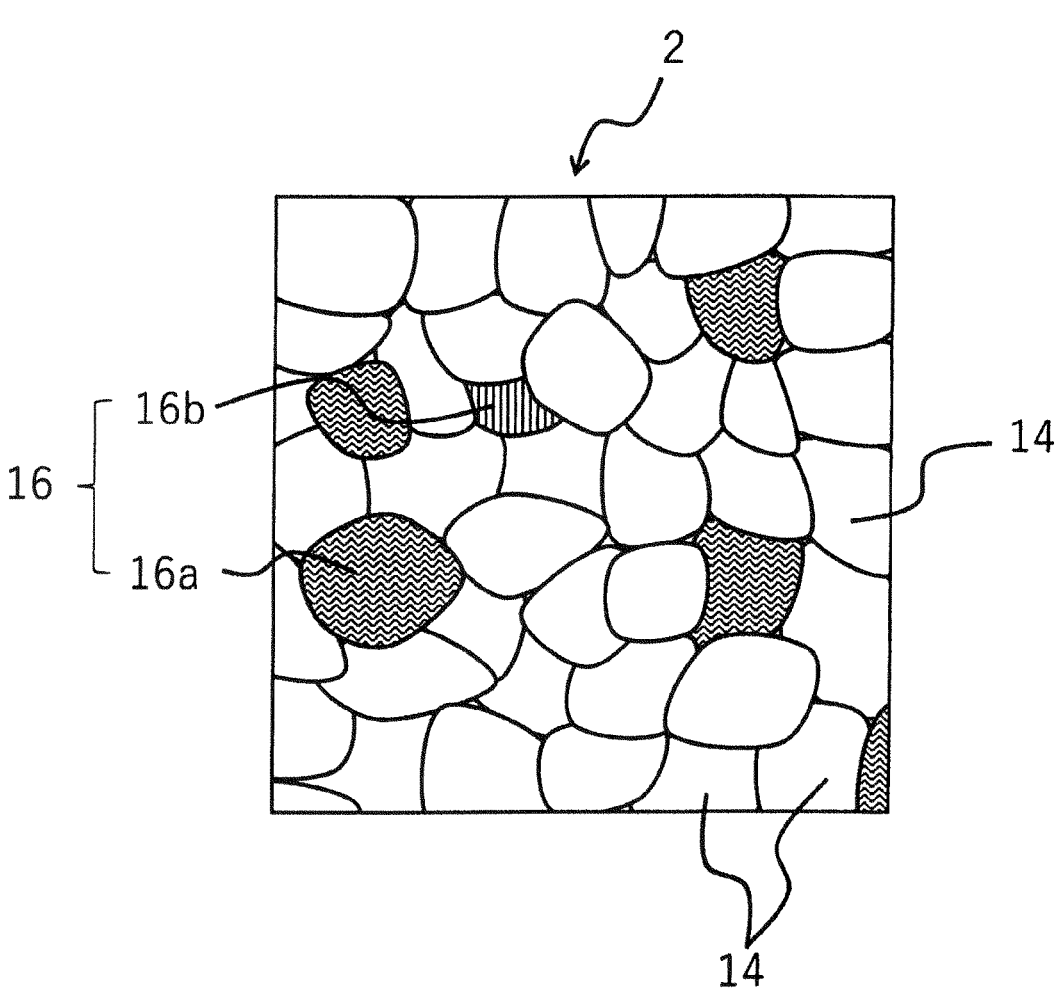

FIG. 1A is a cross-sectional view of a multilayer ceramic capacitor;
FIG. 1B is a cross-sectional view of the multilayer ceramic capacitor along the IB-IB line of FIG. 1A; and
FIG. 2 is a schematic view of a cross section of a dielectric composition.

DETAILED DESCRIPTION OF THE INVENTION

<1. Multilayer Ceramic Capacitor>
1.1 Overall Configuration of Multilayer Ceramic Capacitor
A multilayer ceramic capacitor 1 as a multilayer electronic device according to the present embodiment is shown in FIG. 1A and FIG. 1B. The multilayer ceramic capacitor 1 includes an element body 10 having a structure in which dielectric layers 2 and internal electrode layers 3 are laminated alternately. A pair of external electrodes 4 conducting with the internal electrode layers 3 alternately arranged inside the element body 10 is formed at both ends of the element body 10. The element body 10 has any shape, but normally has a rectangular parallelepiped shape. The element main body 10 has any appropriate size based on usage.

In the present embodiment, the element body 10 may have a vertical dimension L0 of 5.7-0.4 mm (see FIG. 1A), a width dimension W0 of 5.0-0.2 mm (see FIG. 1B), and a height dimension HO of 5.0-0.2 mm (see FIG. 1B).

As a specific size of the element body 10, L0×W0 is (5.7±0.4)mm×(5.0±0.4)mm, (4.5±0.4)mm×(3.2±0.4)mm, (3.2±0.3)mm×(2.5±0.2)mm, (3.2±0.3) mm×(1.6±0.2)mm, (2.0±0.2)mm×(1.2±0.1)mm, (1.6±0.2)mm×(0.8±0.1) mm, (1.0±0.1)mm×(0.5±0.05)mm, (0.6±0.06)mm×(0.3±0.03) mm, (0.4±0.04) mm×(0.2±0.02)mm, or the like. HO is not limited and is, for example, about the same as or less than W0.

1.2 Dielectric Layers
The dielectric layers 2 are compose of a dielectric composition according to the present embodiment mentioned below.

The thickness of the dielectric layers 2 per layer (interlayer thickness) is not limited and can freely be determined based on desired characteristics, applications, and the like. The interlayer thickness may normally be 20 μm or less, 10 μm or less, or 5 μm or less. In the multilayer ceramic capacitor of the present embodiment, the lamination number of dielectric layers 2 is not limited and may be, for example, 10 or more, 100 or more, or 200 or more.

1.3 Internal Electrode Layers
In the present embodiment, the internal electrode layers 3 are laminated so that their ends are alternately exposed on two end surfaces of the element body 10 facing each other.

The internal electrode layers 3 contain any conductive material. Examples of the noble metal used as the conductive material include Pd, Pt, and Ag—Pd alloys. Examples of the base metal used as the conductive material include Ni, Ni based alloys, Cu, and Cu based alloys. The Ni, Ni based alloys, Cu, or Cu based alloys may contain various trace components, such as P and/or S, in an amount of about 0.1 mass % or less. The internal electrode layers 3 may be formed using a commercially available electrode paste. The thickness of the internal electrode layers 3 may be determined appropriately based on usage or so.

1.4 External Electrodes
The external electrodes 4 contain any known conductive material, such as Ni, Cu, Sn, Ag, Pd, Pt, Au, alloys thereof, and conductive resins. The thickness of the external electrodes 4 may be determined appropriately based on usage or so.

<2. Dielectric Composition>

FIG. 2 is a schematic view of a dielectric composition constituting the dielectric layers 2 according to the present embodiment. As shown in FIG. 2, the dielectric composition constituting the dielectric layers 2 according to the present embodiment includes segregation particles 16 between main-phase particles 14. Then, at least a part of the segregation particles 16 are specific segregation particles 16a mentioned below. The dielectric composition may be a dielectric ceramic composition.

2.1 Main-Phase Particles

The main-phase particles 14 of the present embodiment contain a compound having a perovskite crystal structure represented by $ABO_3$ as a main component. The main component of the main-phase particles 14 is a component that occupies 80-100 parts by mass (preferably, 90-100 parts by mass) with respect to 100 parts by mass of the main-phase particles. The main-phase particles 14 may include a component other than the above-mentioned main component and may include, for example, a barium (B a) compound.

"A" is one or more selected from Ba, strontium (Sr), and calcium (Ca). "A" may be one or more selected from Ba and Sr. Ba may be contained at 80 mol % or more with respect to "A" or may be contained at 90 mol % or more with respect to "A". "A" may be only Ba.

"B" is one or more selected from titanium (Ti), zirconium (Zr), and hafnium (Hf). "B" may be one or more selected from Ti and Zr. Ti may be contained at 70 mol % or more with respect to "B" or may be contained at 80 mol % or more with respect to "B". "B" may be only Ti.

Assuming that "A" is one or more selected from Ba, Sr, and Ca, and that "B" is one or more selected from Ti and Zr, the composition of the main component is specifically described as $\{\{Ba_{1-x-y}Ca_xSr_y\}O\}_u(Ti_{1-z}Zr_z)_vO_2$.

"x" is preferably $0\leq x\leq 0.10$, and more preferably $0\leq x\leq 0.05$. "y" is preferably $0\leq y\leq 0.10$, and more preferably $0\leq y\leq 0.05$. "z" is preferably $0\leq z\leq 0.30$, and more preferably $0\leq z\leq 0.15$. u/v is preferably $0.997\leq u/v\leq 1.010$, and more preferably $0.998\leq u/v\leq 1.005$. If u/v is too high, sintering tends to be insufficient, and the relative permittivity and the reliability of the dielectric composition also tend to decrease. If u/v is too low, the firing stability tends to deteriorate, and the temperature characteristics and the reliability of the dielectric composition tend to decrease.

In the present embodiment, the dielectric composition may include one or more selected from magnesium (Mg), manganese (Mn), vanadium (V), and chromium (Cr) as M. In addition, the dielectric composition includes one or more selected from europium (Eu), gadolinium (Gd), terbium (Tb), and dysprosium (Dy) as RA, one or more selected from yttrium (Y), holmium (Ho), and ytterbium (Yb) as RB, and silicon (Si). M is mainly contained in the dielectric composition as an oxide of M. M may replace B of the main component.

Among rare earth elements, RA corresponds to an element whose difference in ionic radius from the A-site atom is smaller than that of RB. Preferably, RA is one or more selected from Dy and Gd. More preferably, RA is Dy. Among rare earth elements, RB corresponds to an element whose difference in ionic radius from the A-site atom is larger than that of RA. Preferably, RB is one or more selected from Y and Ho. More preferably, RB is Y. Since RA and RB are the above-mentioned rare earth elements, the temperature characteristics and the high-temperature load life are improved easily.

An RA content $C_{RA}$ to the main component is 0.60 mol % or more and 2.40 mol % or less, or may be 0.80 mol % or more and 2.10 mol % or less, in terms of $RA_2O_3$. An RB content $C_{RB}$ to the main component is 0.30 mol % or more and 1.20 mol % or less, or may be 0.40 mol % or more and 1.20 mol % or less, in terms of $RB_2O_3$. An M content to the main component is 0.20 mol % or more and 1.00 mol % or less, or may be 0.40 mol % or more and 0.80 mol % or less, in terms of MO. A Si content to the main component is 0.60 mol % or more and 1.80 mol % or less, or may be 0.80 mol % or more and 1.50 mol % or less, in terms of $SiO_2$. Since RA, RB, M, and Si are contained within the above-mentioned ranges, it is possible to control the degree of solid solution of the rare earth element into the main component and the grain growth of the dielectric particles. Then, all of the temperature characteristics, the relative permittivity, and the high-temperature load life of the dielectric composition are favorable. If only RA is contained without containing RB as the rare earth element, the temperature characteristics and high-temperature load life of the dielectric composition decrease.

If the RA content is too small, most of RA are solid-soluted into the main component, and the grain growth of the main component cannot be prevented. As a result, the temperature characteristics and the high-temperature load life of the dielectric composition decrease. If the RA content is too large, the abundance ratio of the main component in the dielectric composition decreases. As a result, the relative permittivity of the dielectric composition decreases. If the RB content is too small, the component for preventing the grain growth of the main component becomes insufficient, and abnormal grain growth of the dielectric particles occurs. As a result, the temperature characteristics of the dielectric composition decrease. If the RB content is too large, the abundance ratio of the main component in the dielectric composition decreases. In addition, the grain growth of the dielectric particles is prevented more than necessary. As a result, the relative permittivity of the dielectric composition decreases. If the M content is too small, abnormal grain growth of the dielectric particles occurs. Along with this, the solid solution ratios of RA and RB into the segregation particles change greatly, and the temperature characteristics and the high-temperature load life of the dielectric composition decrease. When the M content is too large, the grain growth of the dielectric particles is prevented more than necessary. As a result, the solid solution ratios of RA and RB to the segregation particles change greatly, and the high-temperature load life of the dielectric composition decreases. If the Si content is too small, the component to be a sintering aid becomes insufficient. As a result, the sinterability of the dielectric particles deteriorates, and the relative permittivity of the dielectric composition decreases. If the Si content is too large, a large amount of segregation particles other than the specific segregation particles are formed. As a result, the temperature characteristics and the high-temperature load life of the dielectric composition decrease.

RA is a rare earth element having a relatively large ionic radius. RB is a rare earth element having a relatively small ionic radius. The smaller the ionic radius of a rare earth element is, the more difficult it is to proceed with a solid solution of the rare earth element into the main-phase particles. That is, the larger the difference between the ionic radius of the A-site atom of the main component and the ionic radius of the rare earth element becomes, the more difficult it is to proceed with a solid solution of the rare earth element into the main-phase particles. When RA and RB are solid-soluted into the main-phase particles, RA tends to mainly replace the A-site atom of the main component, and RB tends to mainly replace the B-site atom of the main component. When the rare earth element replaces the A-site atom, the rare earth element is solid-soluted into the main-phase particles 14 as a donor component. When the rare earth element and M replace the B-site atom, the rare earth element and M are solid-soluted into the main-phase particles 14 as an acceptor component.

Preferably, the variation in the particle size of the main-phase particles 14 is small. Specifically, the SN ratio of the particle size is preferably high. The SN ratio of the particle size is $10 \times \log_{10}(\mu^2/\sigma^2)$ (unit: dB), where $\mu$ is an average particle size, and $\sigma$ is a standard deviation.

2.2 Segregation Particles

The composition of the segregation particles 16 is not limited. The dielectric composition 2 includes the specific segregation particles 16a mainly including RA, RB, Si, Ba, and Ti as the segregation particles 16. The term of "mainly including RA, RB, Si, Ba, and Ti" means that: a total content of RA and RB is 3.0 mol % or more; a Si content is 1.0 mol % or more; a Ba content is larger than a Ti content; and a total content of RA, RB, Si, Ba, and Ti to a total content of elements other than 0 is 80 mol % or more. The RA content may be 2.0 mol % or more, and the RB content may be 1.0 mol % or more.

In a cross section of the dielectric composition 2, an area ratio of the specific segregation particles 16a to the segregation particles 16 is preferably 80% or more. Examples of the segregation particles 16b other than the specific segregation particles include segregation particles mainly including RA (Dy etc.) and Ti. However, such segregation particles may reduce the high-temperature load life of the dielectric composition 2. Thus, when an area ratio of the specific segregation particles 16a to the segregation particles 16 is 80% or more, the high-temperature load life can be improved.

$0.50 < (\alpha/\beta)/(C_{RA}/C_{RB}) \leq 1.00$ is satisfied, where a is an average RA content (mol %), and $\beta$ is an average RB content (mol %), in the specific segregation particles 16a. That is, an RA content to an RB content in the specific segregation particles 16a is equal to or smaller than an RA content to an RB content in the entire dielectric composition 2. In other words, an RB content to an RA content in the specific segregation particles 16a is equal to or larger than an RB content to an RA content in the entire dielectric composition 2.

As the grain growth of the main-phase particles 14 proceeds during firing, the donor component (mainly, RA) and the acceptor component (mainly, RB and M) are solid-soluted into the main-phase particles 14. At this time, if the grain growth proceeds too much, the temperature characteristics decrease. In addition, the SN ratio of the particle size mentioned above decreases. When the SN ratio of the particle size decreases, the reliability of the dielectric composition 2 decreases, and the high-temperature load life decreases.

Here, since a comparatively large amount of RB is contained in the specific segregation particles 16a (i.e., grain boundaries), the variation in the particle size of the main-phase particles 14 can be prevented, and the SN ratio of the particle size can be increased. As a result, the reliability is improved, and the high-temperature load life is extended. In addition, the particle size of the main phase particles 14 can be controlled easily. This makes it possible to improve the temperature characteristics while maintaining a high high-temperature load life.

Hereinafter, a method of observing the segregation particles 16 in the dielectric composition 2 is explained.

First, a mapping analysis is performed on measurement points of the cross section of the dielectric composition using a scanning transmission electron microscope (STEM) equipped with an energy dispersive X-ray analyzer (EDS). Hereinafter, the STEM equipped with the EDS is referred to as a STEM-EDS. The size of the measurement range is not limited. For example, the measurement range is determined so that the dielectric composition has an area of 50 $\mu m^2$ or more. The obtained mapping image is divided into dots of 0.02 $\mu m$/pixel or more and 0.05 $\mu m$/pixel or less, and the contrast intensity of each element at each dot is quantified. Specifically, the contrast intensity is classified into 91 stages from 0 to 90 with the lowest contrast intensity (no detection) of 0 and the highest contrast intensity of 90. A dot with a contrast intensity of 75 or more for rare earth elements is considered to be a dot with segregated rare earth elements. Then, a portion where the dots with segregated rare earth elements are gathered is considered to be a segregation particle 16. Each segregation particle 16 has an area of at least 0.005 $\mu m^2$. A portion smaller than 0.005 $\mu m^2$ is not considered to be the segregation particle.

Whether the segregation particles 16 are the specific segregation particles 16a or segregation particles 16b other than the specific segregation particles is determined by mainly including RA, RB, Si, Ba, and Ti or not. Then, a ratio of a total area of the specific segregation particles 16a to a total area of the segregation particles 16 can be calculated. In addition, a can be measured by measuring each RA content and averaging them, and $\beta$ can be measured by measuring each RB content and averaging them, for all dots contained in the specific segregation particles 16a. Then, $(\alpha/\beta)/(C_{RA}/C_{RB})$ can be calculated.

<3. Method of Manufacturing Multilayer Ceramic Capacitor>

Next, a method of manufacturing a multilayer ceramic capacitor 1 shown in FIG. 1A is explained below.

As with conventional multilayer ceramic capacitors, the multilayer ceramic capacitor 1 of the present embodiment is manufactured by producing a green chip with a normal printing method or sheet method using a paste, firing this green chip, printing or transferring external electrodes, and firing them. Hereinafter, a method of manufacturing the multilayer ceramic capacitor 1 is specifically explained.

First, dielectric raw materials for forming dielectric layers are prepared and turned into a dielectric-layer paint.

As the dielectric raw materials, a raw material of $ABO_3$ (main component) and raw materials of various other oxides are prepared. As these raw materials, oxides of the above-mentioned components, mixtures thereof, and composite oxides can be used, and various compounds to be the above-mentioned oxides, composite oxides, or the like by firing, such as carbonates, oxalates, nitrates, hydroxides, and organometallic compounds, are appropriately selected and can be used by mixing them. In the present embodiment, it is preferable to use a mixture in which the oxides of the above-mentioned components are uniformly dispersed with respect to the main component, but a dielectric raw material in which the main component is coated with the above-mentioned components may be used.

As raw materials for various oxides other than the raw material for the main component, for example, one or more compounds selected from the group consisting of RA compounds, RB compounds, M compounds, Si compounds, and Ba compounds may be used appropriately. In addition to oxides or composite oxides of each element, the compounds of each element may be any compounds to be an oxide or a composite oxide of each element by firing. The Ba compounds may be, for example, $BaCO_3$.

The raw material of $ABO_3$ (main component) can be manufactured by various methods, such as various liquid-phase methods (e.g., oxalate method, hydrothermal synthesis method, alkoxide method, sol-gel method) in addition to the so-called solid-phase methods.

When the dielectric layers include components other than the above-mentioned components, oxides of those components, mixtures thereof, or composite oxides can be used as raw materials for the components. In addition, various compounds to be the above-mentioned oxides or composite oxides by firing can be used.

Each compound content in the dielectric raw materials is determined so as to have the composition of the above-mentioned dielectric composition after firing.

Any two or more of the raw materials for other various oxides mentioned above may be mixed and calcined before being mixed with the main component. For example, the raw material of the RA oxide, the raw material of the Si oxide, and the raw material of the A oxide contained separately from the main component (e.g., the raw material of the Ba oxide) may be previously mixed and calcined. The calcination temperature is less than 1100° C. Then, the compound powder obtained by calcination, the main component, and the raw materials of various oxides not calcined may be mixed. This makes it easy to prevent the generation of segregation particles other than the specific segregation particles. As a result, the ratio of specific segregation particles is increased easily. Then, the relative permittivity and the high-temperature load life of the dielectric composition are improved easily.

The dielectric-layer paste may be an organic based paint obtained by kneading the dielectric raw materials and an organic vehicle or may be a water based paint.

The organic vehicle is a binder dissolved in an organic solvent. Known binders and solvents are used.

When the dielectric-layer paste is a water based paint, the dielectric raw materials and a water based vehicle in which a water-soluble binder, a dispersant, and the like are dissolved in water are kneaded. The water-soluble binder is not limited and is, for example, polyvinyl alcohol, cellulose, a water-soluble acrylic resin, or the like.

An internal-electrode-layer paste is prepared by kneading the above-mentioned organic vehicle and a conductive material made of Ni or Ni alloy mentioned above or various oxides, organic metal compounds, resinates, etc. to be Ni or Ni alloy mentioned above after firing. The internal-electrode-layer paste may include an inhibitor. The inhibitor is not limited and may have a composition similar to that of the main component.

An external-electrode paste is prepared similarly to the above-mentioned internal-electrode-layer paste.

The amount of the organic vehicle in each of the above-mentioned pastes is not limited and is a normal amount, such as about 1-15% by mass for the binder and about 10-60% by mass for the solvent. If necessary, each paste may include an additive selected from various dispersants, plasticizers, dielectrics, insulators, and the like. The total amount of them may be 10% by mass or less.

When a printing method is used, the dielectric-layer paste and the internal-electrode-layer paste are printed on a substrate, such as PET, laminated, cut into a predetermined shape, and thereafter peeled off from the substrate to obtain a green chip.

When a sheet method is used, green sheets are formed using the dielectric-layer paste, the internal-electrode-layer paste is printed on the green sheets, and these are laminated and cut into a predetermined shape to obtain a green chip.

Before firing, the green chip is subjected to a binder removal treatment. As the binder removal conditions, the heating rate is preferably 5-300° C./hour, the binder removal temperature is preferably 180-900° C., and the holding time is preferably 0.5-48 hours. The atmosphere for the binder removal treatment is the air or a reducing atmosphere (e.g., a humidified $N_2+H_2$ mixed gas atmosphere).

After the binder removal, the green chip is fired. For example, the heating rate may be 200-20000° C./h, the firing temperature may be 1150-1350° C., and the holding time may be 0.1-10 hours.

The atmosphere during firing is not limited either and may be the air or a reducing atmosphere. As an atmosphere gas of the reducing atmosphere, for example, a mixed gas of $N_2$ and $H_2$ can be humidified and used. The oxygen partial pressure may be $1.0\times10^{-14}$ to $1.0\times10^{-9}$ MPa.

The lower the oxygen partial pressure during firing is, the more easily the solid solution of the rare earth element into the main-phase particles proceeds. Comparing RA with RB, the solid solution of, particularly, RA into the main-phase particles proceeds more easily. That is, the lower the oxygen partial pressure during firing is, the more RB remains in the grain boundaries relative to RA. Thus, the RB content in the specific segregation particles becomes large, and $(\alpha/\beta)/(C_{RA}/C_{RB})$ becomes small.

$(\alpha/\beta)/(C_{RA}/C_{RB})$ also changes by the composition of the dielectric composition, particularly the content ratio of various oxides mentioned above.

The larger the RA content to RB is, the larger $(\alpha/\beta)/(C_{RA}/C_{RB})$ becomes. On the other hand, the smaller the RA content to RB is, the smaller $(\alpha/\beta)/(C_{RA}/C_{RB})$ becomes. When the M content is too large or too small, $(\alpha/\beta)/(C_{RA}/C_{RB})$ tends to exceed 1.00.

In the present embodiment, the element body after firing is preferably subjected to an annealing treatment (an oxidation treatment of the dielectric layers). Specifically, the annealing temperature may be 950-1100° C. The holding time may be 0.1-20 hours. The atmosphere during the oxidation treatment may be a humidified $N_2$ gas (oxygen partial pressure: $1.0\times10^{-9}$ to $1.0\times10^{-6}$ MPa).

When the $N_2$ gas, the mixed gas, or the like is humidified in the above-mentioned binder removal treatment, firing, and annealing treatment, for example, a wetter is used. In this case, the water temperature is preferably about 5-75° C.

The binder removal treatment, the firing, and the annealing treatment may be performed continuously or independently.

The capacitor element body obtained as mentioned above is subjected to an end-surface polishing by barrel polishing, sandblasting, or the like, and an external-electrode paste is applied and fired to form the external electrodes 4. Then, if necessary, coating layers are formed on the surfaces of the external electrodes 4 by plating or the like.

The multilayer ceramic capacitor of the present embodiment manufactured in such a manner is mounted on, for example, a printed circuit board by soldering or the like and is used for, for example, various electronic devices.

The present invention is not limited to the above-mentioned embodiment and can variously be modified within the scope of the present invention.

In the above-mentioned embodiment, the fine structure is controlled by particularly controlling the composition and the firing conditions, but the present invention is not limited to this method.

MODIFIED EXAMPLES

In the above-mentioned embodiment, the electronic device according to the present invention is a multilayer ceramic capacitor, but is not limited to the multilayer ceramic capacitor and may be an electronic device including the above-mentioned dielectric composition.

For example, the electronic device according to the present invention may be a single-plate ceramic capacitor in which a pair of electrodes is formed on the above-mentioned dielectric composition.

Hereinbefore, an embodiment of the present invention is explained, but the present invention is not limited to the above-mentioned embodiment and may be modified in various embodiments within the scope of the present invention.

The electronic device and the multilayer electronic device including the dielectric composition according to the present invention have high temperature characteristics, relative permittivity, and high-temperature load life and are thereby particularly favorably used for automobiles.

EXAMPLES

Hereinafter, the present invention is explained in more detail with Examples and Comparative Examples. However, the present invention is not limited to Examples below.
(Preparation of Dielectric Paste)

In the experimental examples other than Examples 15 and 16 mentioned below, first, as raw material powders, a $BaTiO_3$ powder (Ba/Ti=1.004), a $RA_2O_3$ powder, a $RB_2O_3$ powder, a $SiO_2$ powder, a MgO powder, a $MnCO_3$ powder, and a $BaCO_3$ powder were prepared and weighed so that the dielectric composition having the composition of each Example and Comparative Example shown in Tables 1-3 would be obtained. The compositions shown in Tables 1-3 are those when the $BaTiO_3$ (main component) content was 100 mol %. Each example shown in Table 2 had the same composition as Example 2 except for the type of RA and the type of RB. In all experimental examples, the $BaCO_3$ powder content to the main component was 0.7 mol % in terms of BaO. For Mg and Mn contained as M, the atomic ratio was set to Mg:Mn=4:3.

Next, the above-mentioned raw material powders were mixed in wet manner with a ball mill for 20 hours, pulverized, and dried to obtain a dielectric raw material. $MnCO_3$ would be contained as MnO after firing. $BaCO_3$ would be contained as BaO after firing.

Next, 10 parts by weight of polyvinyl butyral resin, 5 parts by weight of dioctyl phthalate (DOP) as a plasticizer, and 100 parts by weight of alcohol as a solvent with respect to 100 parts by weight of the dielectric raw material were mixed by a ball mill with respect to 100 parts by weight of the dielectric raw material and were turned into a dielectric-layer paste.
(Preparation of Internal-Electrode-Layer Paste)

Ni powder, terpineol, ethyl cellulose and benzotriazole were prepared to have a mass ratio of 44.6:52.0:3.0:0.4. Then, these were kneaded with a triple-roll mill and turned into an internal-electrode-layer paste.
(Preparation of Green Chip)

A green sheet was formed on a PET film using the above-mentioned dielectric-layer paste. The green sheet was adjusted so as to have a thickness of 4.0-5.0 μm after drying. Next, an electrode layer was printed in a predetermined pattern on the green sheet using the internal-electrode-layer paste. Then, the green sheet having the electrode layer was prepared by peeling the green sheet from the PET film. Next, green sheets having the electrode layers were laminated and bonded with pressure to obtain a green laminated body. A green chip was prepared by cutting this green laminated body into a predetermined size.
(Preparation of Element Body)

Next, the obtained green chip was subjected to a binder removal treatment, a firing, and an oxidation treatment to obtain an element body as a sintered body.

As the conditions for the binder removal treatment, the heating rate was 25° C./h, the binder removal temperature was 235° C., the holding time was 8 hours, and the atmosphere was the air.

As the firing conditions, the heating rate was 200° C./h, the firing temperatures were those shown in Tables 1-3, the holding time was 2 hours, and the cooling rate was 200° C./h. The atmosphere was a humidified $N_2+H_2$ mixed gas atmosphere. In Example 1, the oxygen partial pressure was about $1.0 \times 10^{-11}$ MPa. In the other experimental examples other than Comparative Example 9 and Example 14, the oxygen partial pressure was not greatly different from that of Example 1. In Comparative Example 9 and Example 14, the oxygen partial pressure was about $1.0 \times 10^{-12}$ MPa.

As the conditions for the oxidation treatment, each of the heating rate and the cooling rate was 200° C./h, the oxidation treatment temperature was 1050° C., the holding time was 3 hours, the atmosphere was a humidified $N_2$ gas, and the oxygen partial pressure was $1.0 \times 10^{-7}$ MPa.

A wetter was used to humidify the atmospheres of the firing and oxidation treatment.
(Preparation of Multilayer Ceramic Capacitor Sample)

Next, the end surfaces of the obtained element body were subjected to barrel polishing, and a Cu paste was applied as external electrodes and baked in a reducing atmosphere to obtain a sample of the multilayer ceramic capacitor shown in FIG. 1A. The size of the obtained capacitor sample was 3.2 mm×1.6 mm×0.7 mm, the thickness of each dielectric layer was 3.2-4.2 and the thickness of each internal electrode layer was 0.8-1.2 The number of dielectric layers was 10.
(Confirmation of Segregation Particles)

The obtained multilayer ceramic capacitor sample was cut in a cross section perpendicular to the dielectric layers (a cross section in the lamination direction). STEM-EDS mapping analysis was performed on a part of the obtained cross section where the presence or absence of segregation phases was determined. In a visual field having a size where five or more internal electrode layers were observed, the obtained mapping image was divided into dots of 0.027μ/pixel, and the contrast intensity of each element at each dot was quantified. Specifically, the contrast intensity was classified into 91 stages from 0 to 90 with the lowest contrast intensity (no detection) of 0 and the highest contrast intensity of 90. A dot having a contrast intensity of 75 or more for rare earth elements was defined as a dot in which rare earth elements were segregated. The portions where the dots with segregated rare earth elements were gathered were defined as segregation particles.

The composition of the segregation particles contained in the obtained mapping image was subjected to point analysis so as to determine whether or not each segregation particle was a specific segregation particle. Then, a ratio of a total area of specific segregation particles to a total area of segregation particles was calculated in the observation range.

Then, an average RA content α and an average RB content β in the specific segregation particles were calculated by measuring an RA content and an RB content at any three points within the specific segregation particles and averaging them. Then, whether or not $(\alpha/\beta)/(C_{RA}/C_{RB})$ was more than 0.50 and 1.00 or less was confirmed. $C_{RA}$ and $C_{RB}$ were confirmed by dissolving the dielectric layers with a mixed solution of hydrochloric acid and hydrogen peroxide water using ICP-AES. Specifically, it was confirmed that $C_{RA}$ was the same as the RA content shown in Tables 1-3, and that $C_{RB}$ was the same as the RB content shown in Tables 1-3. In Tables 1-3, the case where $(\alpha/\beta)/(C_{RA}/C_{RB})$ was more than 0.50 and 1.00 or less was considered to be good, and the case where $(\alpha/\beta)/(C_{RA}/C_{RB})$ was 0.50 or less or more than 1.00 was considered to be bad.

A method of measuring a particle size of each main-phase particle and a SN ratio of the particle size is explained. First, the obtained capacitor sample was cut on a surface perpendicular to the internal electrode layers, and this cut surface was polished to obtain a polished surface. Then, the polished surface was subjected to chemical etching. The polished surface after chemical etching was observed by SEM. Areas of at least about 1000 main-phase particles were measured. The values obtained by converting the measured areas into the circle equivalent diameters were considered to be particle sizes of the main-phase particles. Then, a SN ratio of the particle size was calculated from $10 \times \log_{10}(\mu^2/\sigma^2)$ (unit: dB), where μ was an average particle size, and σ was a standard deviation.

(Measurement of Ceramic Characteristics)

A relative permittivity of the multilayer ceramic capacitor sample was measured using a digital LCR meter (4274A manufactured by YHP). Specifically, a capacitance after 24 hours from a heat treatment for 1 hour at 150° C. was measured. As the measurement conditions, the reference temperature was 25° C., the frequency was 1 kHz, and the input signal level (measurement voltage) was 1.0 Vrms. The relative permittivity was calculated from the capacitance. A relative permittivity of 2200 or more was considered to be good.

A high-temperature load life of the multilayer ceramic capacitor sample was evaluated by measuring a life time while holding a state where a DC voltage of 40 V/μm was being applied at 190° C. In the present examples, the life time was a time from the start of application until the insulation resistance dropped by an order of magnitude. In the present examples, the above-mentioned evaluation was performed on 20 capacitor samples, and a mean time to failure (MTTF) was calculated from the life time of each capacitor sample. The high-temperature load life was considered to be good with a MTTF of 20.0 hours or more, the high-temperature load life was considered to be particularly good with a MTTF of 30.0 hours or more.

A method of measuring a capacitance change rate and a method of evaluating it are shown below. First, capacitances of the multilayer ceramic capacitor sample at −55° C. to 125° C. were measured under the conditions of frequency: 1.0 kHz and input signal level (measurement voltage): 1.0 Vrms. Next, a capacitance change rate was calculated based on the capacitance at 25° C. and was evaluated whether or not the X7S characteristic, which is the temperature characteristic of the EIA standard, was satisfied. Tables 1-3 show the capacitance change rate at 125° C. It was confirmed that the capacitance change rate at −55° C. also satisfied the X7S characteristic in the sample in which the capacitance change rate at 125° C. was within ±22.0%.

In the determination columns of Tables 1-3, the case where the relative permittivity was 2200 or more, the capacitance change rate was within the range of ±22.0%, and the MTTF was 30.0 hours or more was represented by "AA", the case where the relative permittivity was 2200 or more, the capacitance change rate was within the range of ±22.0%, and the MTTF was 20.0 hours or more and less than 30.0 hours was represented by "A", and the case where one or more of the relative permittivity, the capacitance change rate, and the high-temperature load life was not good was represented by "B".

TABLE 1

| | Composition | | | | | Fine Structure | | Characteristics | | | | Firing |
| | | | | | | Ratio of Specific | SN | Capac-itance | Relative | | | Condition Firing |
| Ex./Comp. Ex. | RA(Dy) [mol %] | RB(Y) [mol %] | M [mol %] | Si [mol %] | $(\alpha/\beta)/(C_{RA}/C_{RB})$ | Segregation Partiicles | Ratio [dB] | Change Rate | Permittivity [—] | MTTF [h] | Deter-mination | Temperature [° C.] |
|---|---|---|---|---|---|---|---|---|---|---|---|---|
| Comp. Ex. 1 | 0.50 | 0.80 | 0.70 | 1.10 | good | 77% | 6.1 | −23.2% | 3599 | 11.2 | B | 1240 |
| Ex. 1 | 0.60 | 0.80 | 0.70 | 1.10 | good | 77% | 7.4 | −20.8% | 3479 | 24.1 | A | 1240 |
| Ex. 1a | 0.80 | 0.80 | 0.70 | 1.20 | good | 81% | 7.6 | −19.0% | 3109 | 31.0 | AA | 1240 |
| Ex. 2 | 1.80 | 0.80 | 0.70 | 1.20 | good | 88% | 8.7 | −12.7% | 2437 | 37.9 | AA | 1260 |
| Ex. 3a | 2.10 | 0.80 | 0.70 | 1.20 | good | 91% | 8.0 | −12.1% | 2356 | 32.1 | AA | 1280 |
| Ex. 3 | 2.40 | 0.80 | 0.70 | 1.30 | good | 76% | 7.9 | −9.5% | 2349 | 24.5 | A | 1280 |
| Comp. Ex. 2 | 2.50 | 0.80 | 0.70 | 1.30 | good | 70% | 8.0 | −9.8% | 2179 | 20.9 | B | 1280 |
| Comp. Ex. 3 | 1.80 | 0.20 | 0.70 | 1.20 | good | 71% | 7.1 | −22.9% | 2831 | 25.3 | B | 1240 |
| Ex. 4 | 1.80 | 0.30 | 0.70 | 1.20 | good | 75% | 7.3 | −14.8% | 2663 | 27.7 | A | 1240 |
| Ex. 4a | 1.80 | 0.40 | 0.70 | 1.20 | good | 84% | 7.6 | −14.1% | 2603 | 32.9 | AA | 1240 |
| Ex. 2 | 1.80 | 0.80 | 0.70 | 1.20 | good | 88% | 8.7 | −12.7% | 2437 | 37.9 | AA | 1260 |
| Ex. 5 | 1.80 | 1.20 | 0.80 | 1.20 | good | 89% | 8.2 | −13.5% | 2326 | 33.1 | AA | 1280 |
| Comp. Ex. 4 | 1.80 | 1.30 | 0.80 | 1.20 | good | 80% | 7.7 | −12.2% | 2091 | 27.0 | B | 1280 |
| Comp. Ex. 5 | 1.80 | 0.80 | 0.10 | 1.20 | bad | 59% | 5.8 | −25.6% | 3275 | 8.3 | B | 1220 |
| Ex. 6 | 1.80 | 0.80 | 0.20 | 1.20 | good | 70% | 7.3 | −18.8% | 2941 | 23.4 | A | 1240 |
| Ex. 6a | 1.80 | 0.80 | 0.40 | 1.20 | good | 82% | 7.7 | −15.0% | 2698 | 32.0 | AA | 1240 |

TABLE 1-continued

| Ex./Comp. Ex. | RA(Dy) [mol %] | RB(Y) [mol %] | M [mol %] | Si [mol %] | (α/β)/(C_RA/C_RB) | Ratio of Specific Segregation Partiicles | SN Ratio [dB] | Capacitance Change Rate | Relative Permittivity [—] | MTTF [h] | Determination | Firing Temperature [° C.] |
|---|---|---|---|---|---|---|---|---|---|---|---|---|
| Ex. 2 | 1.80 | 0.80 | 0.70 | 1.20 | good | 88% | 8.7 | −12.7% | 2437 | 37.9 | AA | 1260 |
| Ex. 7a | 1.80 | 0.80 | 0.80 | 1.20 | good | 87% | 8.2 | −12.6% | 2393 | 30.5 | AA | 1260 |
| Ex. 7 | 1.80 | 0.80 | 1.00 | 1.20 | good | 75% | 7.8 | −8.7% | 2343 | 20.9 | A | 1280 |
| Comp. Ex. 6 | 1.80 | 0.80 | 1.10 | 1.20 | bad | 67% | 6.5 | −8.3% | 2320 | 15.4 | B | 1280 |
| Comp. Ex. 7 | 1.80 | 0.80 | 0.60 | 0.50 | good | 61% | 7.0 | −10.1% | 1987 | 20.2 | B | 1280 |
| Ex. 8 | 1.80 | 0.80 | 0.60 | 0.60 | good | 71% | 7.8 | −10.5% | 2349 | 28.3 | A | 1280 |
| Ex. 8a | 1.80 | 0.80 | 0.70 | 0.80 | good | 84% | 7.7 | −11.1% | 2376 | 33.0 | AA | 1280 |
| Ex. 2 | 1.80 | 0.80 | 0.70 | 1.20 | good | 88% | 8.7 | −12.7% | 2437 | 37.9 | AA | 1260 |
| Ex. 9a | 1.80 | 0.80 | 0.70 | 1.50 | good | 83% | 7.1 | −18.0% | 2721 | 33.4 | AA | 1260 |
| Ex. 9 | 1.80 | 0.80 | 0.90 | 1.80 | good | 66% | 7.2 | −17.8% | 2221 | 21.8 | A | 1260 |
| Comp. Ex. 8 | 1.80 | 0.80 | 0.90 | 1.90 | good | 49% | 6.5 | −22.4% | 2433 | 20.9 | B | 1260 |
| Ex. 1 | 0.60 | 0.80 | 0.70 | 1.10 | good | 77% | 7.4 | −20.8% | 3479 | 24.1 | A | 1240 |
| Comp. Ex. 9 | 0.60 | 0.80 | 0.70 | 1.10 | bad | 76% | 6.4 | −19.9% | 2812 | 13.3 | B | 1220 |
| Ex. 2 | 1.80 | 0.80 | 0.70 | 1.20 | good | 88% | 8.7 | −12.7% | 2437 | 37.9 | AA | 1260 |
| Comp. Ex. 10 | 2.40 | 0.00 | 0.70 | 1.10 | — | 82% | 5.6 | −22.4% | 2864 | 5.4 | B | 1260 |

TABLE 2

| Ex./Comp. Ex. | Composition RA | RB | (α/β)/(C_RA/C_RB) | Ratio of Specific Segregation Partiicles | SN Ratio [dB] | Capacitance Change Rate | Relative Permittivity [—] | MTTF [h] | Determination | Firing Temperature [° C.] |
|---|---|---|---|---|---|---|---|---|---|---|
| Ex. 2 | Dy | Y | good | 88% | 8.7 | −12.7% | 2437 | 37.9 | AA | 1260 |
| Ex. 10 | Gd | Y | good | 81% | 7.5 | −21.5% | 2733 | 30.2 | AA | 1240 |
| Ex. 11 | Dy | Ho | good | 78% | 8.1 | −19.6% | 2542 | 28.3 | A | 1260 |
| Ex. 12 | Dy:Gd = 1:1 | Y:Ho = 1:1 | good | 82% | 7.2 | −20.7% | 2591 | 29.0 | A | 1240 |

TABLE 3

| Ex./Comp. Ex. | RA(Dy) [mol %] | RB(Y) [mol %] | M [mol %] | Si [mol %] | (α/β)/(C_RA/C_RB) | Ratio of Specific Segregation Partiicles | SN Ratio [dB] | Capacitance Change Rate | Relative Permittivity [—] | MTTF [h] | Determination | Firing Temperature [° C.] |
|---|---|---|---|---|---|---|---|---|---|---|---|---|
| Ex. 2 | 1.80 | 0.80 | 0.70 | 1.20 | good | 88% | 8.7 | −12.7% | 2437 | 37.9 | AA | 1260 |
| Ex. 9 | 1.80 | 0.80 | 0.90 | 1.80 | good | 66% | 7.2 | −17.8% | 2221 | 21.8 | A | 1260 |
| Ex. 14 | 1.80 | 0.80 | 0.70 | 1.20 | good | 71% | 7.5 | −20.0% | 2703 | 26.4 | A | 1260 |
| Ex. 15 | 1.80 | 0.80 | 0.70 | 1.20 | good | 92% | 8.8 | −13.0% | 2494 | 39.1 | AA | 1260 |
| Ex. 7 | 1.80 | 0.80 | 1.00 | 1.20 | good | 75% | 7.8 | −8.7% | 2343 | 20.9 | A | 1280 |
| Ex. 16 | 1.80 | 0.80 | 1.00 | 1.20 | good | 82% | 7.5 | −11.1% | 2496 | 30.9 | AA | 1280 |

Table 1 shows Examples and Comparative Examples in which the RA, RB, M, and/or Si content were/was mainly changed with Dy (RA) and Y (RB).

In each Example (each component content and $(\alpha/\beta)/(C_{RA}/C_{RB})$ were within a predetermined range), good characteristics were obtained, and the determination was A or AA. In addition, the higher the SN ratio of the particle size of the main-phase particles was, the further the reliability tended to be improved, and the higher the high-temperature load life tended to be.

In Comparative Example 1 (the RA content was too small), the capacitance change rate did not satisfy the X7S characteristic. In addition, the reliability decreased, and the high-temperature load life decreased. This is probably because the grain growth of the main-phase particles could not be prevented sufficiently due to insufficient amount of solid solution of the donor component into the main-phase particles and insufficient total addition amount of components excluding the main component. In Comparative Example 2 (the RA content was too large), the relative permittivity decreased. This is probably because the total addition amount of components excluding the main component was excessive.

In Comparative Example 3 (the RB content was too small), the capacitance change rate did not satisfy the X7S characteristic. This is probably because the grain growth of the main-phase particles could not be prevented sufficiently due to too small RB content. In Comparative Example 4 (the RB content was too large), the relative permittivity decreased. In addition, the high-temperature load life also decreased as compared with the case where the RB content was within a predetermined range. The reason for the decrease in high-temperature load life is considered that the excessive RB content excessively prevented the grain growth and lacked the solid solution amount of the donor component into the main-phase particles.

In Comparative Example 5 (the M content was too small), the capacitance change rate did not satisfy the X7S characteristic. In addition, the reliability decreased, and the high-temperature load life decreased. This is probably because the grain growth of the main-phase particles could not be prevented sufficiently due to too small RB content. In Comparative Example 6 (the M content was too large), the reliability decreased, and the high-temperature load life decreased. This is probably because the solid solution amount of the donor component into the main-phase particles was insufficient due to excessive prevention of the grain growth. In both of Comparative Example 5 and Comparative Example 6, $(\alpha/\beta)/(C_{RA}/C_{RB})$ was larger than 1.00.

In Comparative Example 7 (the Si content was too small), the relative permittivity decreased. This is probably because the grain growth of the main-phase particles was insufficient due to shortage of sintering promotion effect of Si. In Comparative Example 8 (the Si content was too large), the capacitance change rate did not satisfy the X7S characteristic. This is probably because the grain growth of the main-phase particles proceeded too much due to excess of sintering promotion effect of Si.

Comparative Example 9 is an experimental example having a lower firing temperature and a lower oxygen partial pressure during firing as compared with those of Example 1. Since the firing conditions were changed, a large amount of RA, which is comparatively easy to be solid-soluted into the main-phase particles, was solid-soluted into the main-phase particles, and a small amount of RB, which is comparatively difficult to be solid-soluted into the main-phase particles, was solid-soluted into the main-phase particles. As a result, a relatively larger amount of RB was in the segregation particles. Then, $(\alpha/\beta)/(C_{RA}/C_{RB})$ was 0.50 or less. As a result, compared with Example 1, the SN ratio of particle size of the main-phase particles decreased, the reliability decreased, and the high-temperature load life decreased.

Comparative Example 10 is an experimental example carried out with close conditions except that all of RB were changed to RA in Example 2. In this case, RB did not exist in the grain boundaries or the segregation particles. Then, the SN ratio of particle size of the main-phase particles decreased, the reliability decreased, and the high-temperature load life decreased. In addition, the capacitance change rate did not satisfy the X7S characteristic. This is probably because the absence of RB could not sufficiently prevent the grain growth and made it excessive.

Table 2 shows Examples carried out with the same conditions as Example 2 except for changing the type of RA and the type of RB. Even though the type of RA and the type of RB were changed, good characteristics were obtained.

In Table 3, first, Example 2 and Example 9, which are also shown in Table 1, are compared. In Example 2 and Example 9, the ratio of specific segregation particles was larger in Example 2, and the ratio of specific segregation particles was smaller in Example 9. This is due to the difference between the M content and the Si content. In Example 9, compared with Example 2, the ratio of specific segregation particles decreased, and the reliability and the high-temperature load life decreased due to the increase in the ratio of segregation particles other than the specific segregation particles.

Examples of segregation particles other than the specific segregation particles include (RA, RB)—Ti segregation particles mainly including Ti along with RA and RB and not including Si. When such segregation particles increase, the ratio of RA and RB (particularly, RA), which are solid-soluted into the main-phase particles, decreases. As a result, it is considered that the reliability decreased. In addition, when such segregation particles increase, Ti defects are generated in the main-phase particles. As a result, it is considered that the reliability decreased.

Next, Example 2 and Example 14 are compared. Example 2 and Example 14 were carried out with the same conditions except for changing the firing conditions (oxygen partial pressure). Example 14 is an example in which the ratio of specific segregation particles was reduced by reducing the oxygen partial pressure as compared with Example 2. In Example 14, compared with Example 2, the reliability and the high-temperature load life decreased due to reduction in the ratio of specific segregation particles and increase in the ratio of segregation particles other than the specific segregation particles.

Next, Example 2 and Example 15 are compared. Example 15 was carried out with the same conditions as Example 2 except for using a composite oxide obtained by mixing $RA_2O_3$, $RB_2O_3$, $SiO_2$, and $BaCO_3$ in wet manner in a ball mill for 10 hours, pulverizing this mixture, drying it, and calcining it for 1 hour at 600° C. When this composite oxide was used, compared with the case of using the oxide of each element, the generation of segregation particles other than the specific segregation particles was prevented. As a result, the ratio of the specific segregation particles increased. Then, the relative permittivity and the high-temperature load life improved.

Next, Example 7 and Example 16 are compared. Example 16 was carried out with the same conditions as Example 7 except for using a composite oxide obtained by mixing $RA_2O_3$, $RB_2O_3$, $SiO_2$, and $BaCO_3$ in wet manner in a ball mill for 10 hours, pulverizing this mixture, drying it, and calcining it for 1 hour at 600° C. When this composite oxide was used, compared with the case of using the oxide of each element, the generation of segregation particles other than the specific segregation particles was prevented. As a result, the ratio of the specific segregation particles increased. Then, the relative permittivity and the high-temperature load life improved.

DESCRIPTION OF THE REFERENCE NUMERICAL

1 . . . multilayer ceramic capacitor
10 . . . element body
2 . . . dielectric layer
14 . . . main-phase particle
16 . . . segregation particle
16a . . . specific segregation particle
16b . . . segregation particle (other than specific segregation particle)
3 . . . internal electrode layer
4 . . . external electrode

What is claimed is:

1. A dielectric composition comprising:
a main-phase particle including a main component having a perovskite crystal structure represented by a general formula of $ABO_3$; and
segregation particles,
wherein
the dielectric composition includes RA, RB, M, and Si,
A is at least one selected from Ba, Sr, and Ca,
B is at least one selected from Ti, Zr, and Hf,
RA is at least one selected from Eu, Gd, Tb, and Dy,
RB is at least one selected from Y, Ho, and Yb,
M is at least one selected from Mg, Mn, C, and Cr,
the main component occupies 80-100 parts by mass with respect to 100 parts by mass of the main-phase particle,
a total of RA content $C_{RA}$ to the main component is 0.60 mol % or more and 2.40 mol % or less in terms of $RA_2O_3$,
a total of RB content CRB to the main component is 0.30 mol % or more and 1.20 mol % or less in terms of $RB_2O_3$,
a total of M content to the main component is 0.20 mol % or more and 1.00 mol % or less in terms of MO,
a Si content to the main component is 0.60 mol % or more and 1.80 mol % or less in terms of $SiO_2$, and
$0.50 < (\alpha/\beta)/(C_{RA}/C_{RB}) \le 1.00$ is satisfied, where $\alpha$ is an average RA content (mol %) and $\beta$ is an average RB content (mol %) of specific segregation particles including RA, RB, Si, Ba, and Ti in the segregation particles,
a total of content of RA and RB is 3.0 mol % or more,
a Si content is 1.0 mol % or more,
a Ba content is larger than a Ti content,
a content of RA, RB, Si, Ba, and Ti to a total content of elements other than O is 80 mol % or more, and
a total area ratio of the specific segregation particles to a total area ratio of the segregation particles is 80% or more on a cross section of the dielectric composition.

2. The dielectric composition according to claim 1, wherein
the composition of the main component is described as $\{\{Ba_{1-x-y}Ca_xSr_y\}O\}_u(Ti_{1-z}Zr_z)_vO_2$, in which $0 \le x \le 0.10$, $0 \le y \le 0.10$, and $0 \le z \le 0.30$ are satisfied.

3. An electronic device comprising the dielectric composition according to claim 1.

4. A multilayer electronic device comprising dielectric layers and electrode layers alternately stacked, wherein the dielectric layers comprise the dielectric composition according to claim 1.

5. A dielectric composition comprising:
a main-phase particle including a main component having a perovskite crystal structure represented by a general formula of $ABO_3$; and
segregation particles,
wherein
the dielectric composition includes RA, RB, M, and Si,
A is at least one selected from Ba, Sr, and Ca,
B is at least one selected from Ti, Zr, and Hf,
RA is at least one selected from Eu, Gd, Tb, and Dy,
RB is at least one selected from Y, Ho, and Yb,
M is at least one selected from Mg, Mn, C, and Cr,
the main component occupies 80-100 parts by mass with respect to 100 parts by mass of the main-phase particle,
a total of RA content $C_{RA}$ to the main component is 0.60 mol % or more and 2.40 mol % or less in terms of $RA_2O_3$,
a total of RB content $C_{RB}$ to the main component is 0.30 mol % or more and 1.20 mol % or less in terms of $RB_2O_3$,
a total of M content to the main component is 0.40 mol % or more and 0.80 mol % or less in terms of MO,
a Si content to the main component is 0.60 mol % or more and 1.80 mol % or less in terms of $SiO_2$,
$0.50 < (\alpha/\beta)/(C_{RA}/C_{RB}) \le 1.00$ is satisfied, where $\alpha$ is an average RA content (mol %) and $\beta$ is an average RB content (mol %) of specific segregation particles including RA, RB, Si, Ba, and Ti in the segregation particle, and
a total of content of RA and RB is 3.0 mol % or more,
a Si content is 1.0 mol % or more,
a Ba content is larger than a Ti content,
a content of RA, RB, Si, Ba, and Ti to a total content of elements other than O is 80 mol % or more.

6. A dielectric composition comprising:
a main-phase particle including a main component having a perovskite crystal structure represented by a general formula of $ABO_3$; and
segregation particles,
wherein
the dielectric composition includes RA, RB, M, and Si,
A is at least one selected from Ba, Sr, and Ca,
B is at least one selected from Ti, Zr, and Hf,
RA is at least one selected from Eu, Gd, Tb, and Dy,
RB is at least one selected from Y, Ho, and Yb,
M is at least one selected from Mg, Mn, C, and Cr,
the main component occupies 80-100 parts by mass with respect to 100 parts by mass of the main-phase particle,
a total of RA content $C_{RA}$ to the main component is 0.60 mol % or more and 2.40 mol % or less in terms of $RA_2O_3$,
a total of RB content $C_{RB}$ to the main component is 0.30 mol % or more and 1.20 mol % or less in terms of $RB_2O_3$,
a total of M content to the main component is 0.20 mol % or more and 1.00 mol % or less in terms of MO,
a Si content to the main component is 1.20 mol % or more and 1.80 mol % or less in terms of $SiO_2$,
$0.50 < (\alpha/\beta)/(C_{RA}/C_{RB}) \le 1.00$ is satisfied, where $\alpha$ is an average RA content (mol %) and $\beta$ is an average RB content (mol %) of specific segregation particles including RA, RB, Si, Ba, and Ti in the segregation particle, and a total of content of RA and RB is 3.0 mol % or more, a Si content is 1.0 mol % or more, a Ba content is larger than a Ti content, a content of RA, RB, Si, Ba, and Ti to a total content of elements other than O is 80 mol % or more.

* * * * *